United States Patent
Ward et al.

(10) Patent No.: US 6,341,601 B1
(45) Date of Patent: Jan. 29, 2002

(54) SHIELD FOR USE WITH AN OVEN FOR REDIRECTING A THERMAL EXHAUST FLOW

(76) Inventors: John M. Ward, 29507 N. Seaway Ct., Harrison Twp., MI (US) 48045; Gregory Kolecki, 5959 Sutton, Ann Arbor, MI (US) 48105

( * ) Notice: Subject to any disclaimer, the term of this patent is extended or adjusted under 35 U.S.C. 154(b) by 0 days.

(21) Appl. No.: 09/750,729

(22) Filed: Dec. 28, 2000

(51) Int. Cl.[7] .................... A21B 1/08; F24C 15/20
(52) U.S. Cl. ............... 126/21 R; 126/299 R; 126/299 D; 99/443 C
(58) Field of Search .............. 126/299 R, 299 D, 126/21 R, 21 A, 193, 198, 19 R; 99/443 C, 443 R, 386, 401; 432/121, 176, 177, 239; 55/DIG. 36

(56) References Cited

U.S. PATENT DOCUMENTS

| | | | |
|---|---|---|---|
| 4,252,055 A | * | 2/1981 | Johansson et al. ........ 99/443 C |
| 4,378,729 A | | 4/1983 | Pierick |
| 4,382,403 A | * | 5/1983 | Tokayer ................. 99/443 C |
| 4,438,572 A | | 3/1984 | Kaminski |
| 4,483,316 A | | 11/1984 | Fritz et al. |
| 4,616,562 A | | 10/1986 | Kuechler |
| 4,643,167 A | | 2/1987 | Brewer |
| 4,738,243 A | | 4/1988 | Welsh et al. |
| 4,960,100 A | | 10/1990 | Pellicane |
| 5,231,920 A | | 8/1993 | Alden et al. |
| 5,299,557 A | | 4/1994 | Braithwaite et al. |
| 5,421,317 A | | 6/1995 | Cole et al. |
| 5,421,320 A | | 6/1995 | Brown |
| 5,673,681 A | | 10/1997 | Neitzel et al. |
| 5,798,505 A | | 8/1998 | Lee |
| 6,041,772 A | | 3/2000 | Ward et al. |
| 6,041,774 A | | 3/2000 | Ward et al. |

OTHER PUBLICATIONS

Middleby Marshall—"Direct Gas Fired Conveyor Oven" Form No.S : 4103; 4301; 4305; 4501;4502.

* cited by examiner

*Primary Examiner*—James C. Yeung
(74) *Attorney, Agent, or Firm*—Gifford, Krass, Groh, Sprinkle, Anderson & Citkowski, P.C.

(57) ABSTRACT

A shield for use with a conveyor oven for redirecting a thermal exhaust flow. The conveyor oven has a first exterior surface defining an inlet aperture and a second exterior surface defining an outlet aperture. A first shield secures against the first exterior surface of the oven and at a location proximate and above the inlet aperture. A second shield secures against the second exterior surface of the oven and at a location proximate and above the outlet aperture. Each of the first and second shields further includes a body with a forwardly projecting and elongated front surface, first and second side surfaces, and a top surface angling in a generally upward direction between the side surfaces and from the front surface toward the associated exterior oven surface. The body further defines an interiorly hollowed and downwardly facing interior proximate the associated oven aperture. An elongated aperture is defined within the angled top surface, between the first and second side surfaces, and proximate the associated exterior surface of the oven. The shield redirects a thermal exhaust flow emanating through the aperture of the conveyor oven and in an upward direction towards a ventilation hood mounted in an overhead location above the oven.

8 Claims, 2 Drawing Sheets

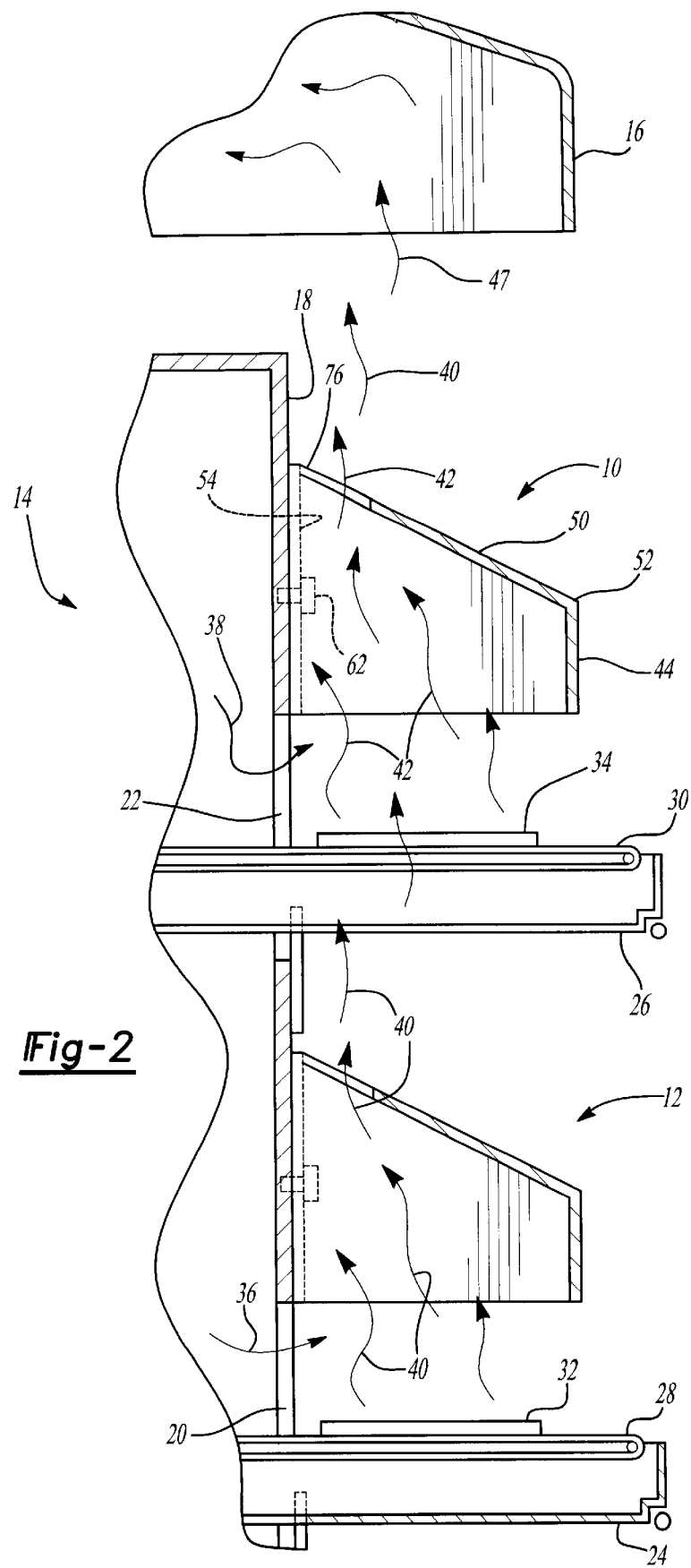

SHIELD FOR USE WITH AN OVEN FOR REDIRECTING A THERMAL EXHAUST FLOW

BACKGROUND OF THE INVENTION

1. Field of the Invention

The present invention relates generally to exhaust shield devices employed in use with conventional ovens. More particularly, the present invention is directed to a shield for use with an oven, such as a conveyor oven having inlet and outlet openings, and in order to redirect a thermal exhaust pattern emanating from either or both the inlet and outlet openings in a substantially upward direction to an overhead mounted ventilation hood.

2. Description of the Prior Art

The prior art is well documented with many types of oven devices, particularly among which are conveyor type ovens suited for use in various segments of the food industry. A particular type of conveyor oven is produced by Middleby Marshall, generally designated as a direct gas fired conveyor oven. These conveyor ovens include an interior cooking chamber, through which is conveyed a desired food product (pizza, seafood, bagels, ethnic foods, etc.). A conveyor belt extends within the cooking chamber, between a first inlet end to a second outlet end. Various model numbers of the Middleby Marshall ovens teach both single and multiple stacked units and in which the inlets and outlets are stacked one above the other.

Also known in the art are ventilation hoods which are mounted in overhead fashion above the cooking appliance, such as again may include a conveyorized cooking oven, and which functions to evacuate from the interior surroundings the heat and particular exhaust emanating from the appliance and in particular through the inlet and outlet openings of the conveyorized belt. Examples of such overhead ventilation hoods are set forth in U.S. Pat. Nos. 6,041,774 and 6,041,772, both issued to Ward and Kolecki, each of which teaches a ceiling mounted structure for removing heat and airborne particulates emanating from the appliance.

U.S. Pat. No. 5,421,320, issued to Brown, teaches a conveyor oven exhaust system with a hood structure incorporated into a conveyorized oven itself, and in contrast to an overhead mounted hood. The hood in Brown is assembled from modules including a central make-up air plenum module mounted directly over the heating stations of a conveyorized double-deck oven, an exhaust plenum module atop the make-up air plenum and downwardly-opening end modules overhanging the conveyor end portions extending outside the sides of the oven heating chambers. The end modules include make-up air directors aiming make-up air upward along the undersides of removable panels having slots therein to accelerate exhaust flow into a chamber below filters to effectively remove fumes from the areas above the conveyor ends. The overhanging end modules also include partitions cooperating with walls of the overhang portions to provide ducts at the front of the overhand portions to capture fumes from the area above the front of the conveyor ends. Air flow guides are provided around the extending portions of the conveyors and a makeup air diverter and diffuser are provided, discharging air from the front of the makeup air plenum down the front of the oven to cool the front exterior surfaces.

Finally, U.S. Pat. No. 4,738,243, issued to Welsh et al., teaches another type of kitchen exhaust hood covering the top of an oven and food conveyors which extend on both sides of the oven. Plates in the hood cooperate with the walls of the hood and to provide slots at the hood front and sides to accelerate the air under the plates adjacent the slots and provide high velocity exhaust air flow upward in the hood at the front and sides of the hood to capture heat and fumes. The plates are located slightly above and the lower edge of the hood, to minimize induction of room air horizontally into the hood under the edge, and assure collection of air that has been associated with the oven and has accumulated heat or collected contaminants. Air flow guides at ends of a conveyor direct heat and fumes around the ends of the conveyor toward the conveyor covering hood portions. Each of these guides are mounted at the outer ends of the conveyor supports and include generally curved or concave shell surfaces which to redirect heat and fines in a redirected fashion back into the oven assembly.

SUMMARY OF THE INVENTION

The present invention is directed to a shield for use with an oven, such as a conveyor oven having inlet and outlet openings, which redirects a thermal exhaust pattern emanating from either or both the inlet and outlet openings in a substantially upward direction to an overhead mounted ventilation hood. A multiple number of redirecting shields may be utilized with a given oven, with each shield being located on an external face of the conveyor oven, proximate and above each of at least the inlet and outlet openings communicating with the interiorly extending conveyorized belt. It is further contemplated that the shields may either be provided as attachable units to retrofit a given oven installation, or may incorporated into the design and manufacture of the oven and thereby be integrally designed as part of the oven exterior shell.

Each shield includes a forwardly projecting and elongated front surface, first and second side surfaces, and a top surface angling in a generally upward direction between the side surfaces and from the front surface toward the associated exterior oven surface. First and second side brackets mount each of the shield bodies to the oven, with each of the redirecting shields further defining an interiorly hollowed and downwardly facing bottom proximate the associated oven aperture.

To facilitate in redirecting the thermal exhaust pattern emanating from the conveyor oven inlets and outlets, an elongated aperture is defined within the angled top surface of the mountable shield, extending substantially between the first and second side surfaces, and located proximate the associated exterior surface of the oven. The shield functions to redirect the thermal exhaust flow emanating through associated aperture of the conveyor oven and in a substantially upward direction close to the exterior surfaces of the oven and towards a ventilation hood mounted in an overhead location above the oven.

The redirecting shields therefore accomplish a number of important objectives, among these including controlling the pattern of the thermal exhaust from the oven and preventing the thermal flow from otherwise permeating throughout the room interior, within which the oven is located, and thereby compromising the conditioned interior air quality. Additionally, the provision of the redirecting shields permits the overhead mounted ventilation hood to be considerably downsized due to the compressed and substantially vertical redirection of the oven thermal exhaust.

BRIEF DESCRIPTION OF THE DRAWINGS

Reference will now be made to the attached drawings, when read in combination with the following detailed description, wherein like reference numerals refer to like parts throughout the several views, and in which:

FIG. 2 is a cutaway view, taken along line 2—2 of FIG. 1, and illustrating the redirected flow pattern of the oven's thermal exhaust and as is provided by the shield attachments of the present invention.

BRIEF DESCRIPTION OF THE PREFERRED EMBODIMENTS

Figure 1:
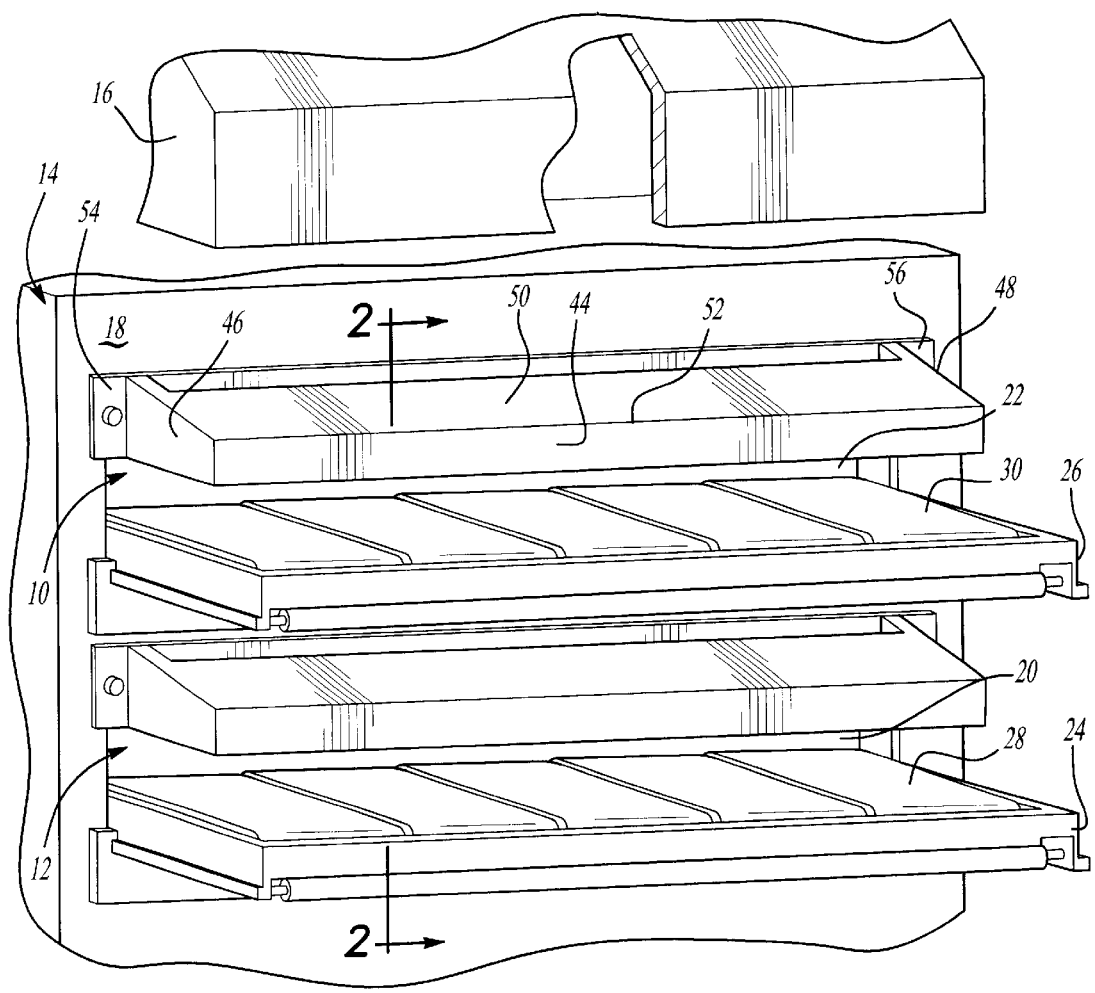
FIG. 1 is a perspective view of an oven with first and second conveyor tiers and associated and thermal redirecting shields according to a preferred embodiment of the present invention.

Referring now to FIG. 1, a pair of first 10 and second 12 redirecting shields are illustrated for use with a conveyor oven 14 according to one preferred embodiment of the present invention. As previously explained, the purpose of the redirecting shields is to capture an emanating thermal flow pattern exhausted from the conveyor oven 14 and to redirect that flow pattern in a substantially localized and upwardly directed fashion for being received within an overhead mounted ventilation hood 16 and beneath which the conveyor oven 14 is substantially centered.

The conveyor oven 14 is, by itself, substantially known in the art and may be constructed according to any of a number of differing specifications, and for example by such as is set forth in the Middleby Marshall disclosures. Typically, the oven 14 includes a first exterior surface defining an inlet aperture and a second exterior surface defining an outlet aperture. Referring again to FIG. 1, and also to FIG. 2, the oven 14 illustrates an exterior surface 18 and within which are illustrated a first aperture (inlet or outlet) 20 associated with a lower tier of the oven 14 and a second aperture (again either an inlet or outlet) 22 associated with an upper tier of the oven 14.

As again was previously, described with reference to the prior art Middleby Marshall oven specifications, the selected conveyor oven may be constructed in a single tier arrangement, in which theoretically only a single shield or a pair of shields are secured in proximity to the associated inlet and/or outlet apertures. Alternatively, the conveyor oven 14 may be constructed in a number of tiers, or levels, such as to increase the production capacity of the appliance and to maximize the efficiency of the thermal energy created.

It is also noted, while only the face 18 of oven 14 is illustrated in the partial views of FIGS. 1 and 2 for purposes of ease of illustration, it is clearly understood that the oven 14 also includes at least an opposite and substantially identical face (not illustrated) and as is again clearly disclosed in the prior art, such as again including the Middleby Marshall conveyor oven specifications. While it is contemplated that the redirecting shields 10 and 12 of the present invention may also be provided with only a selected inlet or outlet aperture of a conveyorized oven device, or an alternatively configured oven in which perhaps only a single aperture or inlet is configured, the preferred embodiment contemplates that a plurality of such shields be utilized at each of associated inlets and outlets of a conveyorized oven, and as again may include either a single tier conveyorized oven or double/multiple tiered oven, and so as to maximize the efficiency of capturing and redirecting the exhausted thermal flow pattern.

Referring again to FIGS. 1 and 2, a first rack 24 is illustrated projecting through the selected lower tier aperture 20 and a second rack 26 likewise projecting through the selected upper tier aperture 22. The construction of the racks 24 and 26 are again as is substantially known in the prior art, these forming part of the conveyor oven 14 and upon which are supported roller driven belt conveyors (see at 28 and 30, respectively, for racks 24 and 26). The racks 24 and 26 permit selected items (32 and 34 for conveyors 28 and 30, respectively) to be placed upon or retrieved from the conveyors, depending again upon whether the apertures 20 and 22 are either inlets or outlets of the oven 14.

Referring again to FIG. 2, it is clearly illustrated, by the plurality of directional arrows 36 and 38, the general manner in which the heat patterns emanate from the apertures 20 and 22 of the oven 14. It is again noted that significant amounts of heat exhaust may exist at either or both the inlet and outlet sides of the single tier or multiple tier conveyor ovens, therefore making it most efficient to apply a shielding/redirecting unit proximate each and every such opening. It is again however understood that the shields of the present invention may be employed to some desired degree of efficiency by placing them over the exterior facing surfaces of the conveyor oven proximate either and/or both the inlet and outlet sides and as is desired.

Referring again to FIG. 2, additional heat directional arrows 40 and 42 illustrate the manner in which the aligning and successively vertically stacked shields 10 and 12 combine and redirect the combined thermal exhaust patterns emanating from the apertures 20 and 22 in the substantially localized and upwardly directing fashion within the overhead ventilation hood 16. The overhead ventilation hood 16 is constructed in a manner known in the art and reference is again made to the representative constructions illustrated and described in U.S. Pat. Nos. 6,041,772 and 6,041,774, both issued to Ward and Kolecki.

Figure 3:
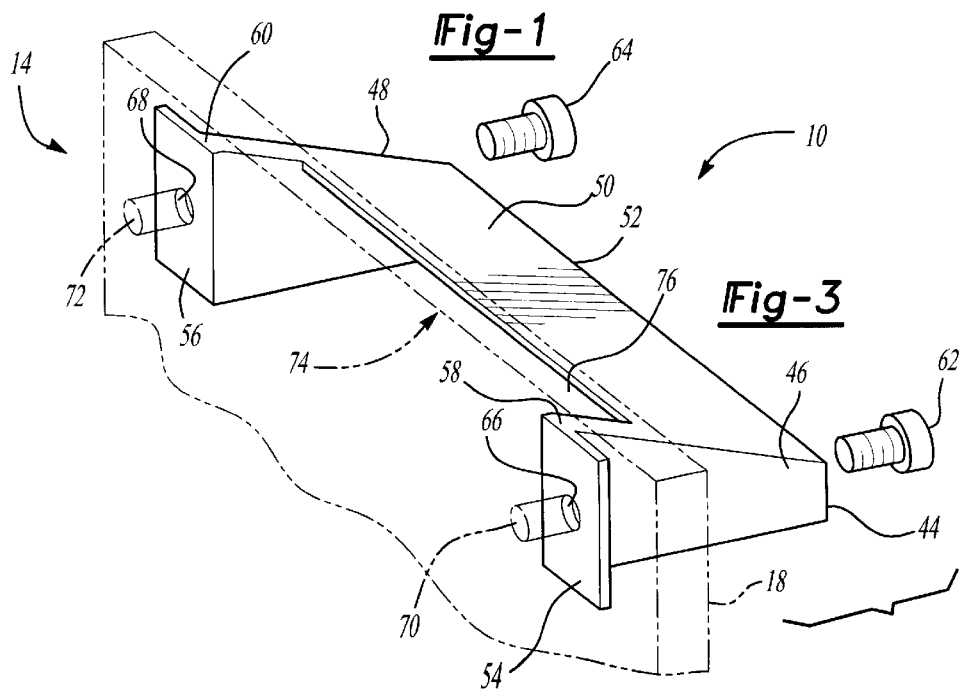
FIG. 3 is a partially exploded view of a manner of securing a selected shield to an associated exterior face of the oven according to an embodiment of the present invention.

Referring now to FIG. 3, a perspective illustration is shown of a selected redirecting shield, such as shield 10 previously specified. As previously indicated, each of the shields 10, 12, et seq., is substantially identically constructed and it is therefore understood that an explanation of the features of the shield 10 is also applicable to each and every of the additional shields secured according to any plurality to the oven construction.

Referring again to FIG. 3, the shield 10 is preferably constructed of a durable and heat conductive and resistant type material, such as a high grade steel, and includes a forwardly projecting and elongated front surface 44, first 46 and second 48 side surfaces, and a top surface 50 angling in a generally upward direction between the side surfaces 46 and 48 and from an adjoining edge 52 of the front surface 44 toward the exterior oven surface, such as again being the selected exterior surface 18 of the conveyor oven 14 illustrated in phantom in FIG. 3. First and second brackets 54 and 56 extend, respectively, in a laterally opposite and outwardly direction from rear adjoining edges 58 and 60 of the side surfaces 46 and 48.

The brackets 54 and 56 function to mount the shield 10 against the exterior surface 18 of the oven, such as through the use of mounting bolts 62 and 64 which extend through holes 66 and 68 formed in the brackets 54 and 56 and aligning apertures (see in phantom at 70 and 72) defined within the oven surface 18. As previously explained, it is also contemplated that the shields 10 and 12 may be integrally formed with the oven 14 during its manufacture, however at least one preferred embodiment contemplates retrofitting the oven with the shields.

The shield 10 is therefore constructed so that the front, sides and angled top making up its body define an interiorly hollowed and downwardly facing interior 74 and which is located proximate the associated oven aperture, such as again has been previously identified as aperture 22 for selected shield 10. It is also possible to modify the three dimensional configuration of the shield body to include other shapes, however the overriding physical principle is that the shield design provide for effective capture, within its downwardly facing interior 74, and redirection of the thermal flow patterns in the manner described herein.

Redirection of the thermal exhaust flow is further provided by an elongated and substantially slot shaped aperture 76 defined within said angled top surface, between said first and second side surfaces, and proximate the exterior surface of the oven, the shield redirecting the thermal exhaust flow emanating through the aperture 76 of the oven and in an upward direction towards the ventilation hood 16 mounted in overhead position above the oven 14 and as is again illustrated in both FIGS. 1 and 2. An axially extending edge section of the angled top 50 of the shield body is actually removed to define the elongated aperture when the shield 10 is applied against the exterior facing surface 18 of the oven 14. However it is also understood that the aperture may not necessarily have to extend along the absolute inner edge of the shield and may instead by formed at a desired intermediate location along the angled top surface 50, again so long as its objective is fulfilled of re-channeling and directing upwardly the exhausted heat patterns to the overhead hood 16. It is also envisioned that the dimension of the elongated aperture 74 in the shield can be modified to extend partly or entirely across the width of the shield body, however it is best understood that the efficiency of the shield is maximized in the event of this aperture 74 extending the entire axial direction between the opposite sides 46 and 48.

Having described our invention, it is apparent that it teaches a thermal redirecting shield for use with an oven, such as a conveyor oven, which is a novel improvement over the prior art. Additional preferred embodiments will become apparent to those skilled in the art to which it pertains and without deviating from the scope of the appended claims.

We claim:

1. A shield for use with an oven, the oven having at least one substantially vertically extending exterior surface with an aperture defined therethrough, said shield comprising:

a body securing against the exterior surface of the oven and in a location proximate and above the aperture, said body including a forwardly projecting and elongated front surface, first and second side surfaces, and a top surface angling in a generally upward direction between said side surfaces and from said front surface toward the exterior oven surface, said body further defining an interiorly hollowed and downwardly facing interior proximate the oven; and an elongated aperture defined within said angled top surface, between said first and second side surfaces, and proximate the exterior surface of the oven, said shield redirecting a thermal exhaust flow emanating through the aperture of the oven and in an upward direction towards a ventilation hood mounted in an overhead location above the oven.

2. The invention as described in claim 1, said body further comprising first and second side brackets mounting said shield body to selected locations of the exterior oven surface.

3. The invention as described in claim 1, the oven further being defined by a conveyor oven with a first exterior surface defining an inlet aperture and a second exterior surface defining an outlet aperture, said invention further comprising a first redirecting shield secured to the oven proximate the inlet aperture and a second redirecting shield secured proximate the outlet aperture.

4. The invention as described in claim 3, the conveyor oven further defining multiple tiered conveyors, said invention further comprising a first plurality of shields secured to the oven proximate each of the inlet apertures, a second plurality of shields secured to the oven proximate each of the outlet apertures.

5. The invention as described in claim 4, further comprising each shield of said first and second plurality of shields being arrayed in aligning and vertically spaced apart fashion.

6. The invention as described in claim 3, the conveyor oven further including a first rack projecting through the inlet aperture and a second rack projecting through the outlet aperture, said invention further comprising said first redirecting shield extending in substantially overhead fashion above said first rack and said second redirecting shield extending in substantially overhead fashion above said second rack.

7. A shield for use with a conveyor oven for redirecting a thermal exhaust flow, comprising:

said conveyor oven having a first exterior surface defining an inlet aperture and a second exterior surface defining an outlet aperture;

a first shield securing against said first exterior surface of said oven and at a location proximate and above said inlet aperture, a second shield securing against said second exterior surface of said oven and at a location proximate and above said outlet aperture;

each of said first and second shields further comprising a body including a forwardly projecting and elongated front surface, first and second side surfaces, and a top surface angling in a generally upward direction between said side surfaces and from said front surface toward said associated exterior oven surface, said body further defining an interiorly hollowed and downwardly facing interior proximate said associated oven aperture; and an elongated aperture defined within said angled top surface, between said first and second side surfaces, and proximate said associate exterior surface of said oven, said shield redirecting a thermal exhaust flow emanating through said aperture of said conveyor oven and in an upward direction towards a ventilation hood mounted in an overhead location above said oven.

8. A shield for use with a conveyor oven for redirecting a thermal exhaust flow, comprising:

said conveyor oven having a first generally horizontally extending exterior surface defining an inlet aperture and a second generally horizontally extending exterior surface defining an outlet aperture;

said oven further having a first rack projecting through said inlet aperture and a second rack projecting through said outlet aperture;

a first shield securing against said first exterior surface of said oven and at a location proximate and above said inlet aperture, a second shield securing against said second exterior surface of said oven and at a location proximate and above said outlet aperture;

each of said first and second shields further comprising a body with a forwardly projecting and elongated front surface, first and second side surfaces, and a top surface angling in a generally upward direction between said side surfaces and from said front surface toward said associated exterior oven surface, first and second side brackets mounting each of said shield bodies to said oven, each of said shields further defining an interiorly hollowed and downwardly facing interior proximate said associated oven aperture; and an elongated aperture defined within said angled top surface, between said first and second side surfaces, and proximate said associated exterior surface of said oven, said shield redirecting a thermal exhaust flow emanating through said aperture of said conveyor oven and in an upward direction towards a ventilation hood mounted in an overhead location above said oven.

\* \* \* \* \*